Figure 1:
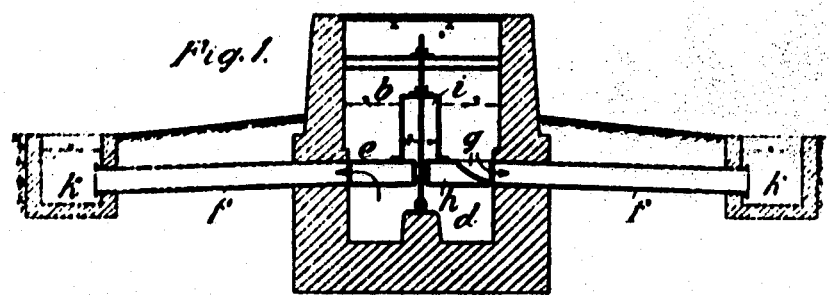

A. ABRAHAM.
HYDRAULIC RAM.
APPLICATION FILED AUG. 4, 1909.

974,620. Patented Nov. 1, 1910.

Witnesses
Henry Hooper.

Inventor
Adolf Abraham
By Mr. Hawlin White
Att'y

UNITED STATES PATENT OFFICE.

ADOLF ABRAHAM, OF CHARLOTTENBURG, GERMANY.

HYDRAULIC RAM.

974,020.   Specification of Letters Patent.   Patented Nov. 1, 1910.

Application filed August 4, 1909. Serial No. 511,307.

*To all whom it may concern:*

Be it known that I, ADOLF ABRAHAM, a subject of the King of Prussia, residing in Charlottenburg, Kingdom of Prussia, German Empire, have invented new and useful Improvements in Hydraulic Rams, of which the following is a specification.

This invention relates to hydraulic apparatus of the kind known as "hydraulic rams" in which the momentum of a falling body of water is caused to raise a portion of itself or another body of water (upon which it acts) to a higher level, and has for its object improvements in such devices whereby large quantities of water possessing only a small head may be profitably employed to drain low lands or to fill reservoirs whence hydraulic power would be available for driving turbines and other motors as well as for other industrial purposes. In times of flood, the water could by means of the present invention be economically raised and by the same means a considerable quantity of the water which is allowed to flow into and through locks on rivers could be returned to the higher level above such lock. Water power of the kind required to actuate the present invention may be found wherever there is tidal water, and not seldom even in the upper reaches of many rivers. Apparatus for this purpose heretofore proposed has been too cumbersome to work profitably under a small head of water and when worked at all the valves upon which their action depends are extremely difficult to maintain in proper working condition owing to the hammering action resulting from the pushing and jerking movements of the water. According to the present invention these difficulties are entirely overcome by the employment of a rotating part driven by any suitable source of power, such, for instance, as the falling water, which is afterward discharged therefrom at points diametrically opposite each other into channels which are also located diametrically opposite each other, until the rotation of this controlling part arrests the discharge of the driving water and at the same time puts the channels, along which the water discharged thereinto is still flowing under the influence of its momentum and gravity, into communication with the body of water to be raised, which is sucked up by the partial vacuum formed by the continued movement of the driving water after the supply is cut off. By the time the momentum of the discharged driving water is spent, the continued rotation of the controlling part will have again established communication between the upper driving water and the channels hereinbefore referred to with the result that the said controlling member will again discharge the actuating water into the aforesaid channels wherein its continued movement under the influence of its momentum and gravity will again form a partial vacuum into which the water to be raised will again be lifted so soon as communication is again established. In this way the blow delivered when the fall of the water is checked is exerted in opposite directions so that any shock that might otherwise be felt is neutralized.

Apparatus constructed according to this invention are extremely simple, self regulating and scarcely need any attention.

I will now proceed to more particularly describe this invention with the aid of the accompanying drawings, in which:—

Figure 2:
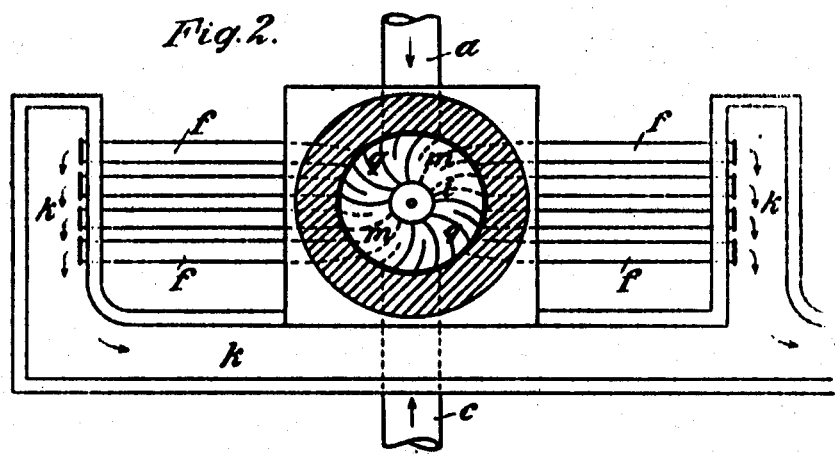
Figure 3:
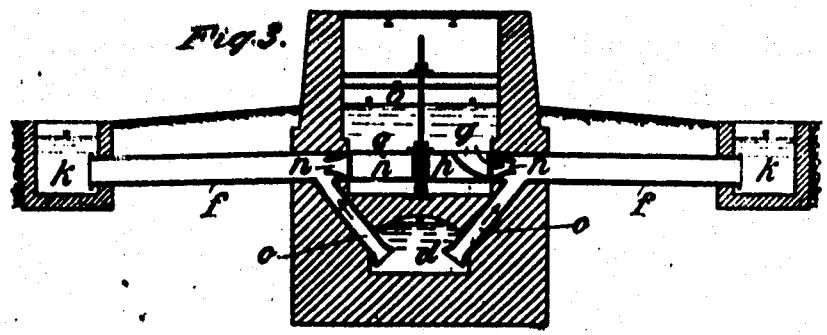

Figure 1 is a vertical cross section of the invention; Fig. 2 is a plan view; Fig. 3 is a similar view to that shown in Fig. 1, illustrating a modification.

Within a circular chamber $b$ is located a rotating controlling member $c$ which is mounted upon a vertical shaft resting upon a suitable step bearing and supported in position by an upper bearing. This controlling member $c$ is provided with four compartments, or a multiple of four, as is shown in the drawing, all of which are open at the periphery of the controller. A half of these compartments $g$ also communicate with the water above the controller, while the other compartments $m$, communicate with the water beneath it in the chamber $d$, which is supplied by the pipe $e$. At the same level as the peripheral openings in the controller $c$, channels $f$ enter the chamber $b$ at points diametrically opposite each other. The number of these channels is only limited by the circumference of the chamber $b$, which they may completely occupy. According to the constructions illustrated by the drawings, the number of the said channels is such that two sets of them are arranged so that each only occupies about a quarter of the circumference. The walls separating the compartments $g$ and $m$ are curved like the buckets of a turbine which cause the driving water to be discharged therefrom in a tangential direction which causes the controller e to rotate by reason of the reaction. This construction, however, is only necessary when the rotative power is derived from the falling water. The driving water is led by the pipe a (Fig. 2) into the chamber b, whence it flows through the compartments g into the channels f causing the controller e to rotate until the discharge of the actuating water is cut off and communication is established between the channels f and the chamber d when the continued forward movement of the water in the said channels will suck up some of the water in the lower chamber through the compartments m, whence it will be delivered with the driving water into the reservoir k.

The foregoing describes the operation of the improved apparatus as a suction ram.

The controller e is provided with an air chamber i with which the driving water communicates in order to neutralize water shocks. This chamber i and the empty cavity h, also serve to reduce the weight of the controller e by increasing its buoyancy.

It will be understood that the number of the channels f may be varied to suit circumstances, and that the speed of rotation of the controller may be regulated so as to admit fresh driving water to the channels, $f_1$ directly the energy stored up in the previous quantity discharged is exhausted and that the relative size or number of the compartments, g, and m may be so proportioned as to correspond with the ratio of the fall of the driving water to the height to which the lower water is to be raised. In cases where these levels vary, means may be employed for varying the relative number or size of the compartments communicating with the upper and lower chambers, such as partitions or covers sliding vertically or pivoted by the central shaft which may either cut off single compartments entirely from action or may only vary their size, in the latter case preferably simultaneously enlarging one compartment when diminishing the adjacent one. These means may be actuated in any suitable way. The compartments g and m may be provided with additional blades as is shown in the drawings.

When it is desired to use the apparatus as a pressure ram, the driving water flows from the reservoir k through the channels f, whence it enters the peripheral openings of the controller e, which it causes to rotate, unless other means of rotation are employed. During the time the driving water continues to flow through the compartments m, it acquires momentum by reason of its fall from the higher level of k into the chamber d. This momentum produces a pressure when the fall is checked by the interposition of one of the compartments g, which is sufficient to lift a proportion of the water above the level of the reservoir k.

According to a modification,—illustrated by Fig. 3 and Fig. 2—the plan of both constructions being substantially similar—nozzles n are arranged inside the channels f, so as to form a hydraulic injector by means of which water is drawn up through the pipes o. According to this construction, the controller e differs from that described with reference to Fig. 1 in that the compartments m have no communication with chamber d. With this form of apparatus water is raised from the chamber d through the pipe o, both by the momentum of the driving water after it has been discharged into the channels f, as well as during the time the said driving water is being delivered into such channels when the apparatus works as an injector. For the efficient working of this form of my invention, the driving water must have sufficient energy to actuate the apparatus and produce a water jet of sufficient velocity to work the injector.

In some cases a reaction wheel of the kind known as a Scotch turbine which has two or more tubular arms that do not coöperate with pallets, may be employed in the place of the rotary controller described. In this case the tubular arms would discharge water only when passing the channels f. Or, I may drive the controller e by any independent means and regulate its speed by any convenient well-known means.

What I claim and desire to secure by Letters Patent of United States is:

1. A hydraulic ram comprising a casing having chambers therein, pipes connecting with said chambers, a series of pipes communicating with said casing, and a rotatable member in said casing between the chambers and having ports therein communicating with the interior of the casing and with the said series of pipes.

2. A hydraulic ram comprising a casing having an upper and a lower chamber therein, pipes connecting with said chambers, a rotating member separating said chambers and having ports therein, and a series of pipes communicating with the casing, some of said ports connecting the upper chamber with said pipes, and others of said ports connecting said pipes with the lower chamber, whereby the rotation of said members will bring each pipe of the series alternately in communication with the upper and lower chamber.

3. A hydraulic ram comprising a casing having an upper and a lower chamber therein, pipes connecting with said chambers a series of pipes communicating with said casing, a rotating member having ports therein communicating with the interior of the casing and with the said pipes, said member being rotated by the passage of water through the chamber.

4. A hydraulic ram comprising a casing having chambers therein, means for feeding the driving water to one chamber, and the driven water to the other chamber, an outlet pipe leading from said casing, and means actuated by the driving water for alternately connecting and disconnecting said pipe with said chambers, whereby the suction created by the passage of said driving water through the pipe will draw into said pipe the driven water.

5. A hydraulic ram comprising a casing having chambers therein, means for feeding the driving water to one chamber, and the driven water to the other chamber, a series of pipes leading from said casing, means actuated by the driving water for alternately connecting and disconnecting said pipes with said chambers, whereby the suction created by the passage of the driving water through said pipes will draw the driven water into said pipes.

6. A hydraulic ram comprising a casing having chambers therein, means for feedi[ng] the driving water to one chamber, and [the] driven water to the other, pipes leading fr[om] said casing, means actuated by the drivi[ng] water for alternately connecting and disco[n]necting said pipes with the driving wa[ter] and also with the driven water.

7. A hydraulic ram comprising a casi[ng] having chambers therein, means for feedi[ng] the driving water to one chamber and t[he] driven water to the other, pipes leading fr[om] said casing, and a rotating member in sa[id] casing having ports therein which alt[er]nately connect and disconnect the said pi[pes] with the driving water and other po[rts] which alternately connect and disconnect t[he] said pipes with the driven water.

In witness whereof I have hereunto set [my] hand this 23rd day of July, 1909, in the pr[es]ence of two subscribing witnesses.

ADOLF ABRAHAM.

Witnesses:
HENRY HASPER,
ARTHUR SCHROEDER.